Dec. 12, 1961  A. HOHMANN  3,012,719
REMOTE READOUT INDICATOR
Filed Oct. 7, 1958  4 Sheets-Sheet 1

INVENTOR.
ALBERT HOHMANN
BY
AGENT.

Dec. 12, 1961  A. HOHMANN  3,012,719
REMOTE READOUT INDICATOR
Filed Oct. 7, 1958  4 Sheets-Sheet 2

INVENTOR.
ALBERT HOHMANN
BY
AGENT.

Dec. 12, 1961 A. HOHMANN 3,012,719
REMOTE READOUT INDICATOR
Filed Oct. 7, 1958 4 Sheets-Sheet 3

INVENTOR.
ALBERT HOHMANN
BY
AGENT.

Dec. 12, 1961

A. HOHMANN 3,012,719

REMOTE READOUT INDICATOR

Filed Oct. 7, 1958

INVENTOR.
ALBERT HOHMANN

BY James H. Conner

AGENT.

United States Patent Office 3,012,719
Patented Dec. 12, 1961

3,012,719
REMOTE READOUT INDICATOR
Albert Hohmann, Brooklyn, N.Y., assignor to American Electronics, Inc., Los Angeles, Calif., a corporation of California
Filed Oct. 7, 1958, Ser. No. 765,819
7 Claims. (Cl. 235—92)

This invention relates generally to indicating counters and more particularly to an indicating counter which may be disposed remotely from a count initiating means. The present invention is directed toward the provision of a counter having visual count indicating indicia which is controlled by remote count initiating means, such as a printing counter or the like and which is novelly controlled to rapidly indicate differing counts accurately with a time cycle that is practical and which does not interfere with or exceed the counting cycle of the initiating counter.

The initiating count indicating means may consist of the manually actuated key box having a plurality of push buttons, each of which individually controls electrical circuit means which set up control circuits and which may be read out by the remote counter. Essentially, the present invention comprises a read-out system for visually indicating a count that is initiated by means remote from the count indicator.

Accordingly, one of the principal objects of the invention resides in the provision of a remote count indicating system having count initiating means and remote means for visibly indicating the count on said count indicating means.

Another object of the invention resides in the provision of a novel means for determining the count on said count indicating means.

Still another object of the invention resides in the provision of means to visibly indicate the count that is on the count initiating means.

Yet another object of the invention is to provide in the count indicating means, novel controlling means for controlling the visible indicator.

And another object of the invention is to provide controlling means for controlling the visible indicator which operates in a positive manner and with a limited period of operation in a time cycle that permits the visible reading of continuously changing counts.

Still another object of the invention resides in the provision of a novel count indicating means having a structural assembly wherein the indicating means occupies a minimum space while remaining within practical and useful dimensional limits.

Other ancillary objects will be, in part, hereinafter pointed out and will be, in part, hereinafter apparent.

Figure 1:
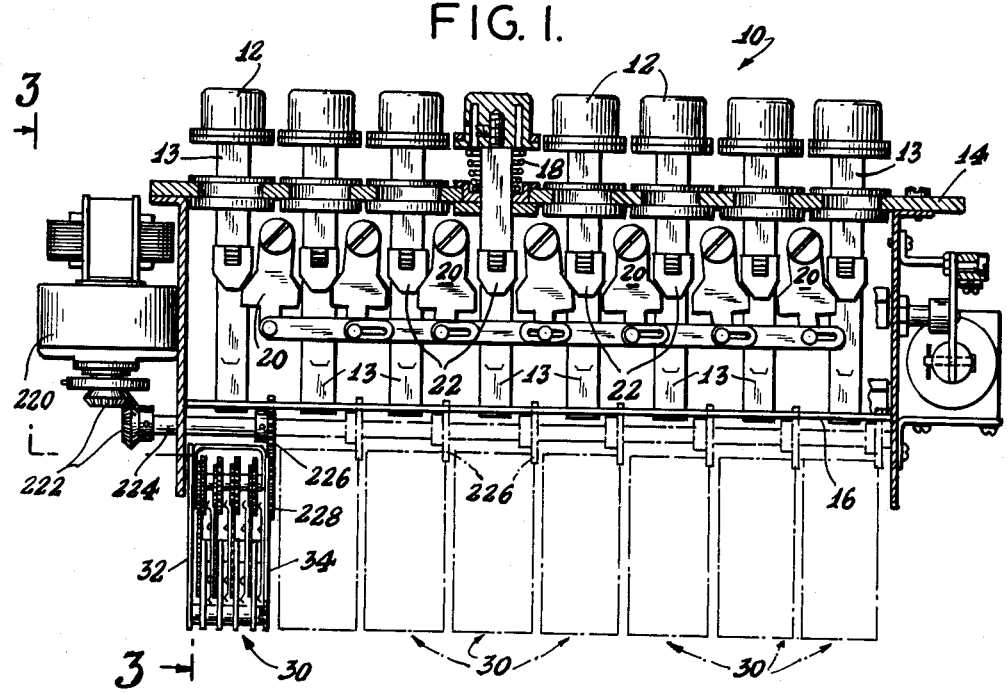
FIGURE 1 is a side elevation of a key box mechanism illustrating only the necessary components thereof relative to the present invention.
Figure 2:
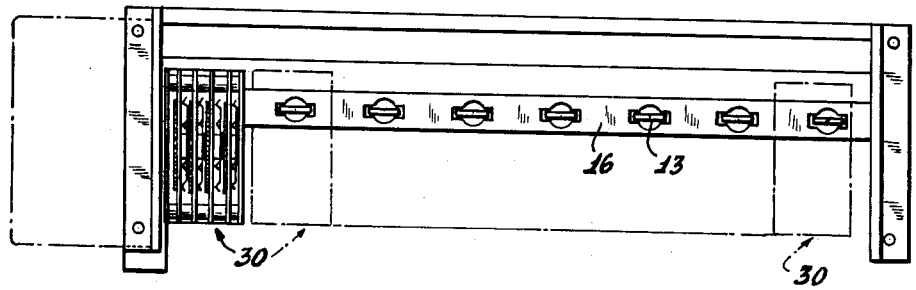
FIGURE 2 is a rear view of the key box mechanism.
Figure 3:
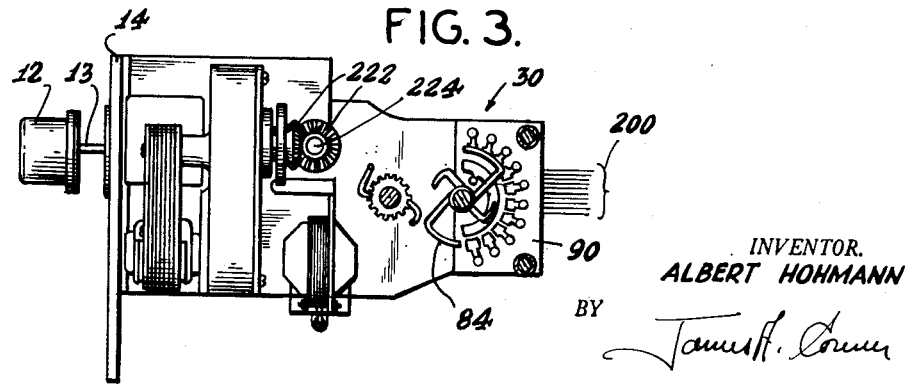
FIGURE 3 is a cross sectional detail taken along line 3—3 of FIGURE 1.

Referring to the drawings in detail, there is provided a key box 10 consisting of a plurality of push buttons 12, each being attached to a slide bar 13 that is slideably mounted in appropriate guide apertures in the front and rear frame pieces 14 and 16 and disposed intermediate the push button 12 and frame piece 14. Disposed circumjacently around each slide bar 13 is a coil spring 18 which is adapted to be compressed upon the manual depression of the button 12 which moves the slide bar 13 downwardly, as viewed in FIGURE 1.

The push buttons 12 are of the type wherein once a depressing movement has been initiated, the button must be depressed in its entirety before it is released. In a similar manner, interlocking means are provided to prevent the accidental or otherwise concurrent depression of more than one push button 12. This generally comprises a plurality of pivotally mounted members generally designated as 20, which co-act with the cam pieces 22 mounted on the slide bars 13. The spacing between the members 20 and their interconnecting links are such that only a single slide carried cam portion 22 may pass between adjacent members 20.

The physical structure of the push buttons along with the description of the interlocking means is completely described in Patent No. 2,683,870, issued July 13, 1954, and need not be described in detail herein. It is sufficient to say that the slide bar 13 moves downwardly a predetermined distance upon the depression thereof.

Figure 5:
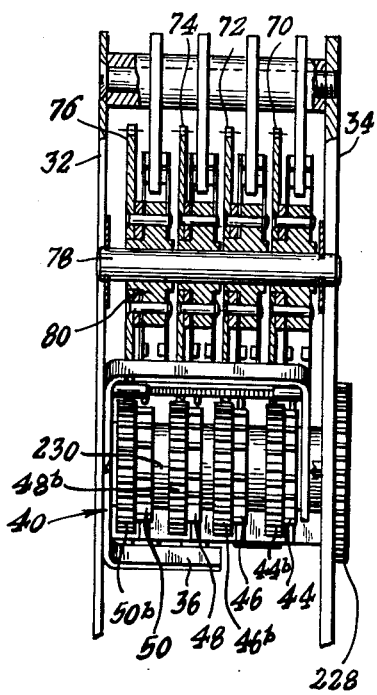
FIGURE 5 is a left hand elevation of the circuit controlling mechanism shown in FIGURE 4.
Figure 6:
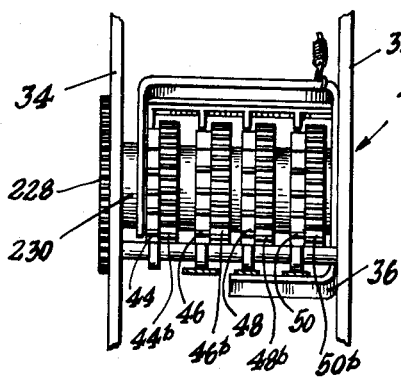
FIGURE 6 is a fragmentary detail illustrating a comb-type counter.
Figure 7:
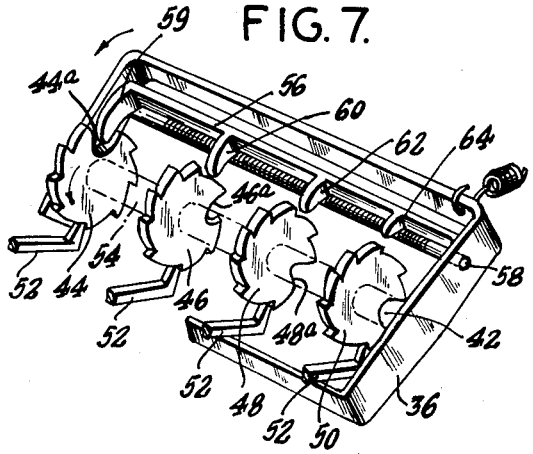
FIGURE 7 is a perspective detail expanded to illustrate the operations of a comb-type counter.

The present invention includes a novel switching arrangement which is co-operable with the slide bar 13 and is adapted to be actuated thereby each time the related push button 12 is depressed. The novel switching arrangement generally consists of a unit which may be designated as 30 and which comprises a pair of side walls 32 and 34 respectively, formed to provide tab means, not shown, with which the unit 30 may be mounted on the rear frame piece 16. Slide bar 13, when depressed, is adapted to engage a pivotally mounted bail 36, FIGURES 5, 6, and 7, which rotates a digit wheel actuating mechanism generally designated as 40.

Counter mechanism 40 is of the comb type wherein the plurality of individually rotatable counter or digit wheels are journalled on a shaft 42. Each of the counter wheels 44, 46, 48, and 50 respectively are of the ratchet type and are further provided with spring urged pawls 52 which prevent retrograde movement thereof. Means are provided to rotate the counter wheels 44 through 50 in seriatum manner with each actuation of the bail 36.

The action or operation of bail 36 in rotating counter wheels 44, 46, 48, and 50 is well known to those skilled in the art. Comb-type counters have been well developed and are used primarily in time stamping devices. The counter wheels 44, 46, and 48 are respectively provided with a recess 44a, 46a, 48a, that are angularly offset one from the other relative to the common axis shaft 54. Cooperable with the recesses 44a through 48a is a comb 56 that is pivotally mounted on a shaft 58 journalled in the bail 36. Comb 56 has depending therefrom a plurality of fingers 59, 60, 62, and 64, each of differing size and each being adapted to cooperate with the related recesses 44a, 46a, 48a in the respective counter wheels. The comb 56 is spring urged to position the longest of the fingers, i.e. finger 59, in periphery engagement with the counter wheel 44. Each rotation of the bail 36 in effect advances counter wheel 44 one unit or digit. It will be noted that the length of the finger 59 being greater than the fingers 60, 62, or 64, prevents engagement of the fingers 60, 62, and 64 with their respective counter wheels. However, upon the tenth rotation of the bail 36, the finger 59 will enter the recess 44a, permitting a single advancement of the counter wheel 44 and at the same time permitting the finger 60 to engage the periphery of counter wheel 46, thereby rotating counter wheel 46 one digit. It will be obvious that each cycle of rotation will advance the units counter wheel 44 one increment. With each ten increments or each complete rotation of unit counter wheel 44, tens counter wheel 46 will be engaged by its finger 60 and rotated one increment. Similarly, with each complete rotation of tens counter wheel 46, the hundreds finger 62 will engage counter wheel 48 for one increment of movement. Analogously, the thousands wheel 50 rotates in increments congruous to each complete rotation of the hundreds counter.

This mode of accumulative counting is acknowledged to be old and is basically controlled by the bail 36. In the present invention, each of the counter wheels 44, 46, 48, and 50 is individually journalled on the common shaft 54 and they are retained in their relative positions by means of the spring urged pawls 52.

Figure 4:
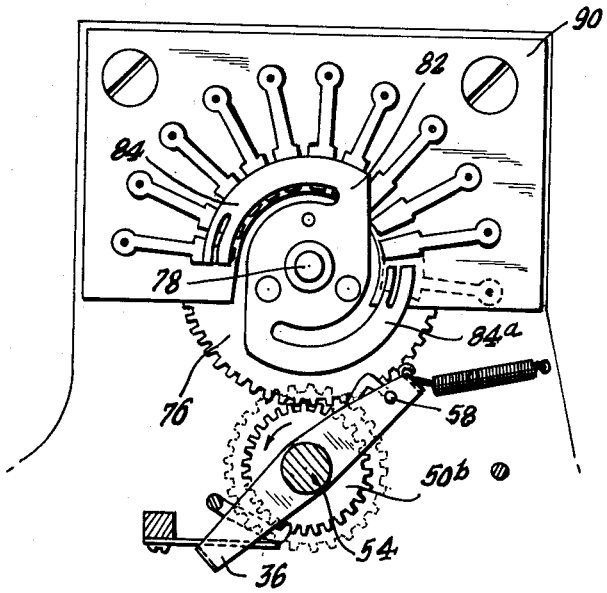
FIGURE 4 is an enlarged cross sectional detail of the circuit controlling means.

Affixed to each of the respective counter wheels 44, 46, 48, and 50 and rotatable therewith is a pinion 44b, 46b, 48b, and 50b. The pinions 44b through 50b are disposed in engagement with gears 70, 72, 74, and 76 respectively. Gears 70 through 76 are individually rotatable and journalled on a common shaft 78, that is mounted intermediate the side frame pieces 32, 34 of the counter mechanism. Gear 76 is disposed in meshing engagement with pinion 50b and is provided with a ratio of two to one wherein each increment of rotation of counter wheel 50 rotates pinion 50b a similar increment of rotation and gear 76 one-half increment. Gear 76 is affixed to a rotatable hub 80 formed of electrically insulating material. Hub 80 further has mounted thereon contact members 82 which are provided with a pair of diametrically opposite arms 84 and 84a. There are a pair of contact members 82 provided having their contact arms 84, 84a oppositely extending toward each other to wipe a contact board 90 disposed therebetween. Contact board 90 is of the printed circuit type having a plurality of contact making areas thereon. As shown in FIGURE 4, each of the contact boards 90 is provided with ten contact making areas so that each increment of rotation of the counter wheels correspondingly provides an increment of rotation of the contact members 82 relative to the printed contacts on the contact board 90. It will be apparent that the same structure is provided for the counter wheels 44, 46, and 48. Thus an accumulation of counts on the counter wheels 40 is reproduced in contact positions of the contact members 82 relative to the contacts on the printed circuit board 90.

Thus it will be obvious that the contact boards 90 are continuously corresponding to the accumulation of counts resulting from the repetitive actuation of the buttons 12 in the key box mechanism 10.

Remotely disposed from the counter mechanism 40 is the counter indicating means generally designated as 100. The counter indicating mechanism 100 generally comprises a pair of side walls 102, 104, spaced apart one from the other by means of cross pieces 106 and provided with a front plate 108. Front plate 108 is affixed to the front cross pieces 106 by means of screws 110. Front plate 108 is further provided with a window section 112 provided for a purpose hereinafter appearing. Disposed within the area defined by side walls 102, 104 is an indicating mechanism that generally comprises a plurality of rotatable wheels 120, 122, 124, and 126. Each of the wheels 120 through 126 have engraved thereon numerical indicia that may be observed through the window 112 as a consecutive columnar group of digits. The indicating wheels 120 through 126 are journalled on a common shaft 128 that is journalled in suitable bearings in the respective side walls 102, 104. Shaft 128 extends through and beyond the side wall 104 and has affixed thereon a gear 130. Gear 130 is connected by means of a chain 132 to a pinion 136 that is journalled on a stud 138. Pinion 136 is affixed to a gear 140 which is disposed in meshing engagement with a pinion 142 affixed to and rotatable with the shaft 144 of an electric motor 146. Motor 146 is similarly secured to the side wall 104 whereby the shaft 144 extends therethrough and is disposed to engage the gear 140. Thus it is obvious that the rotation of motor shaft 144 through pinion 142, gear 140, pinion 136, chain 132, gear 130 will rotate shaft 128. Shaft 128 is accordingly in continuous rotation while the motor 146 is energized. The digit indicating wheels 120 through 126 rotate with shaft 128 by means of a simple friction clutch interconnecting each of the respective digit wheels with the shaft 128. Thus the digit indicating wheels are analogously continuously rotating when the electric motor 146 is energized.

Figure 9:
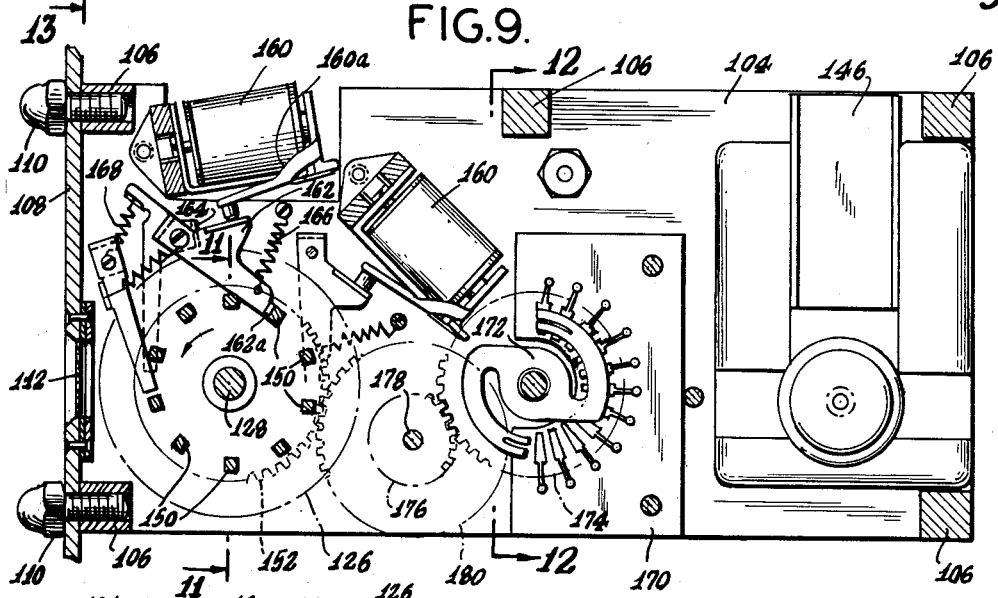
FIGURE 9 is a cross sectional detail taken along line 9—9 of FIGURE 8.
Figure 11:
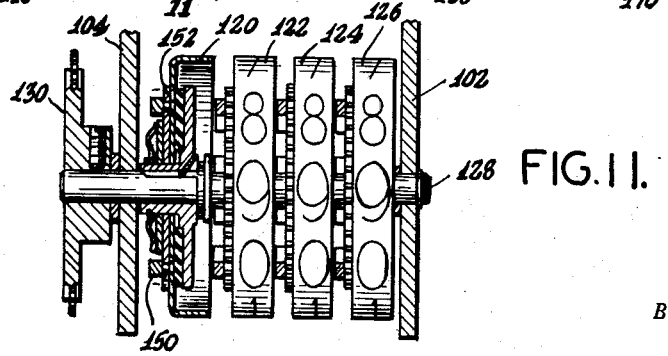
FIGURE 11 is a cross sectional detail taken along line 11—11 of FIGURE 9.
Figure 10:
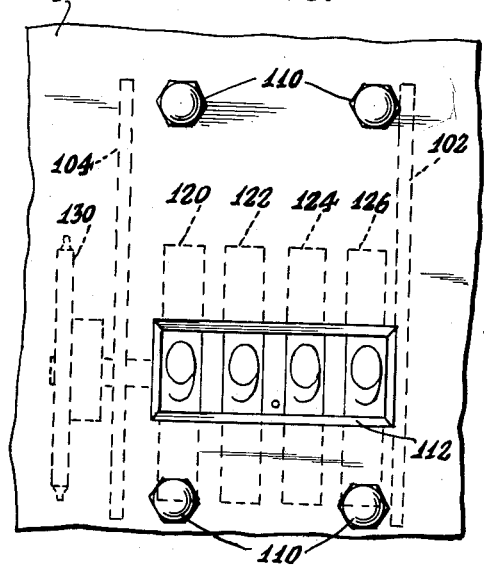
FIGURE 10 is a front view of the count indicating means.
Figure 13:
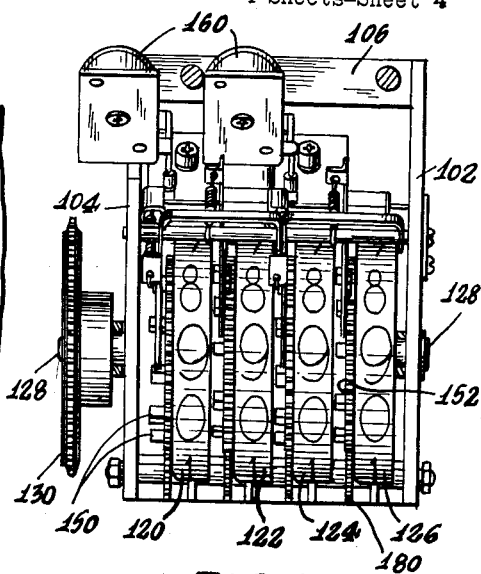
FIGURE 13 is a cross sectional detail taken along line 13—13 of FIGURE 8.
Figure 12:
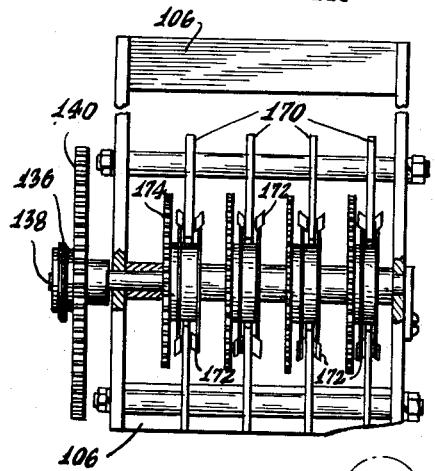
FIGURE 12 is a cross sectional detail taken along line 12—12 of FIGURE 9.
Figure 14:
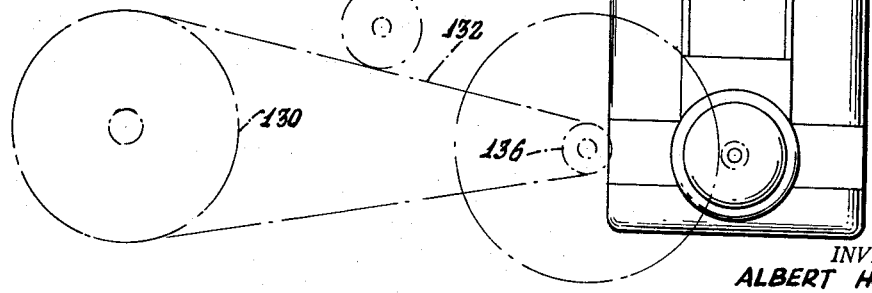
FIGURE 14 is a schematic diagram of the drive mechanism of the remote indicator.

Means are provided to arrest the respective indicating wheels 120 through 126 when a read-out operation is desired, and directly toward this end is a novel selecting mechanism that breaks or arrests the rotation of the wheels 120 through 126 at selected increments of rotation to present selected indicia which may be observed at the window 112. The arresting mechanism generally comprises a plurality of protrusions 150 that are discriminately disposed in digital relation around one side of each of the indicating wheels 120 through 126. It will be noted that the arresting mechanisms are duplicated for each of the indicating wheels and accordingly only the arresting mechanism associated with indicating wheel 120 will be herein described. Protrusions 150 are affixed to and extend co-axially from the side of a pinion 152 which is affixed to and rotatable with indicating wheel 120. There are ten protrusions 150 that are disposed equidistantly one from the other in radial relation and equal in number the indicia representations disposed on the periphery of the indicating wheel. Thus the pinion 152, the protrusions 150, and wheel 120 are continuously rotating under control of the electric motor 146. Each of the indicating wheels 120 through 126 are similarly constructed and have associated therewith a pinion 152 and protrusions 150 extending therefrom. Associated with each indicating wheel is a solenoid 160. Solenoids 160 are affixed to suitable mounting means and disposed in offset aligned relation with the respective indicating wheels 120 through 126. There is a solenoid 160 provided for each of the indicating wheels. Cooperating with the solenoid 160 is a lever 162 that is pivotally mounted on a shaft 164 disposed between the side walls 102, 104. Lever 162 has secured at one end thereof a spring 166 and at the other end thereof a spring 168. Further, one end of lever 162 is provided with an angularly offset portion 162a that is adapted to engage a selected protrusion 150 when solenoid 160 is energized. As shown in FIGURE 9, upon energization of solenoid 160, armature 160a engages lever 162 and rotates said lever against the tension of springs 166 and 168 clockwise to engage a protrusion 150. The energization of solenoid 160 is substantially instantaneous and is effected in timed relation to engage a selected protrusion 150 to arrest the rotation of the indicating wheel, to present particular indicia at the window 112. The energization of the solenoids 160 is controlled directly by a plurality of printed circuit boards 170. Printed circuit boards 170 are similar in construction to the printed circuit boards 90 hereinbefore described, i.e. they are each provided with a rotating contact wiper and a plurality of spaced contacts. The wiper is so designed to engage a single contact with each increment of rotation thereof. The contact wiper 172 is affixed to a pinion 174 that is disposed in meshing engagement with a pinion 176 journalled on a shaft 178. Also journalled on shaft 178 and affixed to the pinion 176 is a gear 180 which is disposed in meshing engagement with the gear 152 affixed to the indicating wheel. Thus it will be noted that continuous revolution of each of the indicating wheels similarly provides continuous revolution of the contact wiper members 172.

Figure 15:
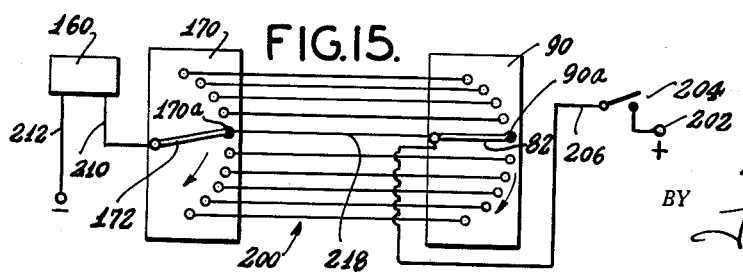
FIGURE 15 is a schematic diagram of the solenoid control circuit.
Figure 8:
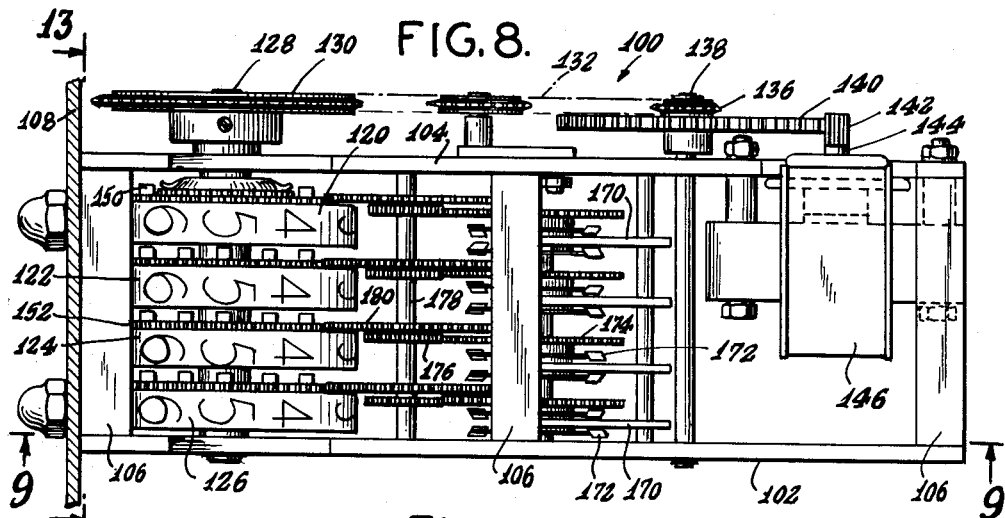
FIGURE 8 is a plan view of the remote indicator.

A simple electrical circuit is established from the counter unit 40 to accurately energize the solenoids 160 to arrest the respective indicating wheels in proper relation to indicate the particular accumulated count on the counter unit 40. This circuit is schematically illustrated in FIGURE 15 wherein the contacts of the printed circuit board 90 are electrically connected to related contacts in the printed circuit board 170 by means of a plurality of conductors generally designated as 200. As previously set forth, the contact member 82 rotated in accordance with the accumulated counts that were added onto the counter mechanism 40. Therefore at any selected period the contact member 82 will be resting in engagement with a contact corresponding to the count on the counter wheel. A circuit is established to connect a source of potential with the wiper arm 82 that is engaging the contact, which in turn connects the source of potential to the related contact on the printed circuit board 170 disposed in the remote read-out indicator. Further, the rotating contact 172 upon engaging the live contact completes the circuit to the solenoid 160 thereby energizing said solenoid. The energization of the solenoid effectively arrests the indicating wheel and similarly arrests the rotating contact member 172. The contact member 172 remains on the live contact as long as the source of potential is not interrupted. This simple circuit may be traced in FIGURE 15 as follows: From a source of positive potential 202 through a controlled switch 204, over a conductor 206, through the wiper arm 82, to a contact designated as 90a, over conductor 208, to a contact 170a, through the wiper contact member 172, over a conductor 210, to one terminal of solenoid 160. The other terminal of solenoid 160 is connected by a conductor 212 to a source of negative potential.

It will be apparent that a complete circuit consisting of the printed circuit board 90 and the printed circuit board 170 is provided for each of the counter wheels and its related indicator wheel. Thus each of the counter wheels are continuously preset in accordance with the actual count thereon and when it is desired to take a read-out of the particular count a plurality of contact making members 204 are closed which then energize the related solenoids 160 which arrest the indicating wheels in the selected position to display the portion of the indicating wheels adjacent the window 112 that corresponds to the counter on the counter wheels.

After a period of time the contact making members are reopened and the solenoids 160 de-energize, thereby permitting the indicating wheels to return to their continuous rotating movement. When a subsequent read-out is desired, where the count on the counter mechanism has changed, the contact members 204 may be closed and the read-out operation occurs.

While the present read-out device has been disclosed in association with a simple accumulative counter, it is readily understood that other numerical data accumulating machines could be utilized to control the read-out mechanism in a similar manner.

It may be pointed out that the counter units 30 are of the resettable type wherein after an accumulation of counts the units may be reset to zero. As shown in FIGURE 1, a motor 220 is disposed to drive through beveled gearing 222 a shaft 224 which is journalled in the side plate members of the button box. Affixed to and rotatable with shaft 224 is a plurality of pinions 226. Each pinion 226 is disposed in meshing engagement with a pinion 228 that is affixed to the shaft 230 on which counter wheels 44, 46, 48, and 50 are journalled. While it is not shown, the counter wheels 44 through 50 are connected to the shaft 230 uni-directionally by means of a pawl, not shown. Thus, the counter wheels may travel or rotate relative to the stationary shaft 230. However, rotation of shaft 230 in the direction of rotation of the counter wheels will pick up the pawl associated with each wheel and rotate each wheel to an initial or index position. This type of zero resetting is well known to those skilled in the art. Of course, motor 220 is provided with a one revolution clutch device so that the wheels always restore to a zero position.

Thus it is apparent that there has been provided a device in which the several objects of the invention are achieved and which is well adapted to meet the conditions of practical use.

While there has been shown and described a single embodiment of the invention, it is to be understood that modifications and changes might be made without departing from the scope of the present invention, except as limited by the claims.

The invention claimed is:

1. A system for remotely sampling and displaying the count on a counter, comprising an indicator having a rotatable wheel having indicia thereon, a plurality of radially disposed equidistantly spaced, protusions co-axially extending from said wheel, means to rotate said rotatable wheel, a counter operable to accumulate counts thereon, means to sense the count on said counter, and means controlled by said sensing means to engage and arrest the rotation of said rotatable wheel in indexed indicia relation to the count on said counter, and said controlled means including an actuatable member actuatable to move between a selected pair of protrusions of said plurality of protrusions to engage one of the pair of protrustions and stop rotation of the rotatable wheel and wedge between the engaged protrusion and the other protrusion of the selected pair of protrusions to index the indicia on the rotatable wheel.

2. A visual read-out indicating system comprising a counter having a rotatable digit wheel, means to actuate said counter wheel to accumulate counts thereon, contact means including a plurality of fixed contacts corresponding in number to the number of digits on the digit wheel and a rotatable wiper contact associated with the digit wheel of said counter, means controlled by said counter digit wheel to actuate the rotatable wiper contact to individually contact the plural fixed contacts in corresponding relation to the count on said counter, rotatable visual digit indicator means, a plurality of radially disposed equidistantly spaced protrusions mounted on said indicator means, means to rotate said rotatable indicator means, a second contact means including a plurality of fixed contacts corresponding in number to the digits on said indicator means, a rotatable wiper contact associated with said rotatable indicator means, means controlled by said indicator means to actuate said second rotatable wiper contact to individually contact the second fixed plural contacts in corresponding relation to the digit indicia on said indicator means, normally-open circuit means interconnecting said first and second contact means, means to close said normally-open circuit means, and means energized by said circuit means to engage and arrest said rotating rotatable indicator means in a predetermined relation corresponding to the contact of the first fixed plural contacts engaged by the related wiper contact, and said arresting means including an actuatable member actuatable to move between two protrusions if said plurality of protrusions and engage one of said two protrusions to arrest the rotation of said indicator means and to wedge the actuated member between the engaged protrusion and the other protrusion of the two protrusions to index the arrested indicator means in predetermined indicia displaying relation.

3. A visual read-out indicating system comprising a counter having a rotatable digit wheel, means to actuate said counter wheel to accumulate counts thereon, contact means including a plurality of fixed contacts corresponding in number to the digits on said digit wheel and a rotatable wiper contact associated with said counter, means controlled by said counter digit wheel to actuate the rotatable wiper contact to individually contact the fixed contacts in corresponding relation to the count on said counter, rotatable visual digit indicator means, a plurality of radially disposed equidistantly spaced protrusions mounted on said indicator means, means to rotate said rotatable indicator means, a second contact means including a plurality of fixed contacts corresponding in number to the digits on said indicator means associated with said rotatable indicator means and a rotatable wiper contact, means controlled by said indicator means to actuate said second rotatable wiper contact to individually contact the second fixed plural contacts in corresponding relation to the digit indicia on said indicator means, normally-open circuit means inter-connecting said first and second contact means, means to close said normally-open circuit means, means energized by said circuit means to engage and arrest said rotating rotatable indicator means in a predetermined relation corresponding to the contact of the first fixed plural contacts engaged by the related wiper contact, and said arresting means including an actuatable member actuatable to move between two protrusions of said plurality of protrusions and engage one of said two protrusions to arrest the rotation of said indicator means and to wedge the actuated member between the engaged protrusion and the other protrusion of the two protrusions to index the arrested indicator means in predetermined indicia displaying relation, and means to release said arresting means operable upon the opening of said circuit closing.

4. A visual counter read-out device comprising an indicia-bearing wheel, a plurality of radially disposed equidistantly spaced protrusions mounted on said indicia-bearing wheel, means to rotate said wheel, a rotatable counter wheel, rotatable electrical switch means including a wiper contact and a plurality of fixed contacts adapted to be individually engaged by the wiper contact upon rotation thereof, means to synchronously and concurrently rotate said counter wheel and the wiper contact of said switch means in the same incremental relation, a second rotatable electrical switch means including a wiper contact and a plurality of fixed contacts adapted to be individually engaged by the wiper contact upon the rotation thereof, means actuatable to engage and arrest the indicia-bearing wheel including an electromagnetically actuated member actuatable to move between a selected two protrusions of said plurality of protrusions when energized and engage one of said two protrusions to arrest the rotation of the indicia-bearing wheel and to wedge the operated member between the engaged protrusion and the other protrusion of said two protrusions to index the arrested indicia-bearing wheel, and means controlled by both said first and second switch means to actuate said arresting means to engage and arrest the indicia-bearing wheel in the indexed relation corresponding to the count on said counter wheel.

5. A counter having rotatable count accumulating wheels, thereon, plural rotatable electrical switch means each including a wiper contact and a plurality of fixed contacts adapted to be individually engaged by the wiper contact upon rotation thereof cooperable with said wheels, the related wiper contact being rotated in synchronism with the respective count wheel, means to actuate said count wheels to accumulate counts seriatum thereon, the combination thereof with a remote count indicator comprising a plurality of continuous rotating digit indicating wheels, each of said wheels having a plurality of radially disposed equidistantly spaced protrusions, a second rotatable electrical switch means including a wiper contact and a plurality of fixed contacts adapted to be individually engaged by the wiper contact upon rotation thereof, and means controlled by both of said electrical switch means to selectively engage and stop said rotating indicating wheels to display digital data thereon corresponding to the count on said counter wheels, and said controlled means including a plurality if independently actuatable members, each being actuatable to move between any two protrusions of the plurality of protrusions of the related indicating wheel and engage one of the said two protrusions and stop the rotation of the related indicating wheel and to wedge the actuated member between the engaged protrusion of said two protrusions and the other protrusion of said two protrusions to index the related indicating wheel in data displaying relation.

6. A counter having a rotatable count accumulating wheel thereon, rotatable electrical switch means including a wiper contact and a plurality of fixed contacts adapted to be individually engaged by the wiper contact upon rotation thereof and cooperable with said wheel, said wiper contact being rotatable in synchronism with said wheel, means to actuate said counter wheel to accumulate counts seriatum thereon, the combination thereof with a remote count indicator comprising a continuously rotating digit indicating wheel, a plurality of radially disposed equidistantly spaced protrusions mounted on said indicating wheel, a second rotatable electrical switch means including a wiper contact and a plurality of fixed contacts adapted to be individually engaged by the wiper contact upon rotation thereof, said second electrical switch means being rotatable in synchronism with said digit indicating wheel, and means controlled jointly by both of said electrical switch means to selectively engage and stop said rotating indicating wheel to display digital data thereon corresponding to the count on said counter wheel, and said control means comprising a solenoid having an operable armature that when energized, moves between a pair of selected protrusions mounted on the indicator wheel to engage of the protrusions of said pair of protrusions to stop the rotation of the wheel and wedge between the engaged protrusion and the other protrusion of the pair of protrusions to index the digit indicated on said indicating wheel, and to stop said indicator wheel against rotation in either direction.

7. In combination with an incrementally rotatable electrical counter, an incrementally rotatable indicating device having a plurality of radially disposed equidistantly spaced protrusions mounted on and rotatable with the device, a first rotary switch associated with said counter including a wiper contact synchronously rotatable with said counter, a second rotary switch means associated with said indicating device including a wiper contact synchronously rotatable with said device, each of said rotary switches further having insulated fixed contact for each increment of rotation of the respective counter and indicating device engageable individually by the respective wiper contact, circuit means interconnecting the respective fixed contacts of one rotary switch with the respective fixed contacts of the second rotary switch, normally-open switch means connecting the wiper contact of the first rotary switch with a source of electrical power, an electromagnetically operated device, means controlled by the wiper contact of said second rotary switch to electrically actuate the electromagnetically operated device to move a lever between a pair of protrusions of the plurality of protrusions on the indicating device and engage one of said pair of protrusions and stop rotation of the indicating device and wedge between the engaged protrusion and the other protrusion of said pair of protrusions to index the indicating device to indicate the count on said counter, and means to close said normally-open switch means to electrically actuate said electromagnetically operated device.

References Cited in the file of this patent

UNITED STATES PATENTS

| | | |
|---|---|---|
| 2,733,008 | D'Andrea et al. | Jan. 31, 1956 |
| 2,759,672 | Simonds et al. | Aug. 21, 1956 |
| 2,796,830 | Hilton | June 25, 1957 |
| 2,840,807 | Todd et al. | June 24, 1958 |
| 2,855,149 | Bickford et al. | Oct. 7, 1958 |
| 2,896,845 | Hansen et al. | July 28, 1959 |